United States Patent
Bobbitt et al.

(10) Patent No.: US 10,684,881 B2
(45) Date of Patent: *Jun. 16, 2020

(54) BATCH PROCESSING OF COMPUTING ELEMENTS TO CONDITIONALLY DELETE VIRTUAL MACHINE(S)

(71) Applicant: International Business Machines Corporation, Armonk, NY (US)

(72) Inventors: Robin Y. Bobbitt, Raleigh, NC (US); Nicholas Ibarluzea, Durham, NC (US); Matthew P. Jarvis, Burlington, MA (US); Brianna A. Kicia, Raleigh, NC (US); Max W. Vohlken, Woburn, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,173

(22) Filed: Nov. 7, 2017

(65) Prior Publication Data

US 2019/0138334 A1 May 9, 2019

(51) Int. Cl.
| | |
|---|---|
| *G06F 9/455* | (2018.01) |
| *G06F 9/46* | (2006.01) |
| *G06F 16/13* | (2019.01) |
| *G06F 11/22* | (2006.01) |
| *G06F 11/36* | (2006.01) |
| *G06F 9/50* | (2006.01) |
| *G06F 11/34* | (2006.01) |

(52) U.S. Cl.
CPC ...... *G06F 9/45558* (2013.01); *G06F 11/2247* (2013.01); *G06F 11/3688* (2013.01); *G06F 16/137* (2019.01); *G06F 9/5022* (2013.01); *G06F 11/3442* (2013.01); *G06F 11/3668* (2013.01); *G06F 2009/45562* (2013.01); *G06F 2009/45575* (2013.01)

(58) Field of Classification Search
CPC ...................................................... G06F 9/455
See application file for complete search history.

(56) References Cited

U.S. PATENT DOCUMENTS

| | | | |
|---|---|---|---|
| 6,330,653 B1 * | 12/2001 | Murray | G06F 3/0605 711/173 |
| 8,166,341 B2 | 4/2012 | Dehaan et al. | |
| 8,190,857 B2 | 5/2012 | Meng et al. | |

(Continued)

OTHER PUBLICATIONS

Mao et al, Auto-Scaling to Minimize Cost and Meet Application Deadlines in Cloud Workflows, 2011, ACM, SC11 (Year: 2011).*

(Continued)

*Primary Examiner* — Abu Zar Ghaffari
(74) *Attorney, Agent, or Firm* — Yee & Associates, P.C.

(57) ABSTRACT

A computer-implemented method, computer program product and computing system for batch processing computing elements on a computing system are provided. The computer-implemented method, computer program product and computing system determine a configuration of the computing system hosting the computing elements, identify a plurality of computing elements to batch process, and batch process the plurality of computing elements based on the determined configuration of the computing system.

9 Claims, 4 Drawing Sheets

(56) References Cited

U.S. PATENT DOCUMENTS

| | | | |
|---|---|---|---|
| 8,224,935 B1* | 7/2012 | Bandopadhyay | G06F 9/5072 370/256 |
| 8,321,867 B1* | 11/2012 | Holl, II | G06F 3/0605 714/48 |
| 8,789,041 B2* | 7/2014 | Verma | G06F 8/63 718/1 |
| 9,473,353 B2* | 10/2016 | Amann | H04L 41/082 |
| 9,516,451 B2* | 12/2016 | Hugard, IV | H04W 4/38 |
| 9,697,032 B2* | 7/2017 | Dalal | H04L 41/0843 |
| 9,811,356 B2* | 11/2017 | Whitney | G06F 9/44505 |
| 9,851,988 B1* | 12/2017 | Elisha | G06F 9/5077 |
| 9,871,697 B2* | 1/2018 | Stefansson | G06F 9/44505 |
| 9,929,931 B2* | 3/2018 | Breitgand | G06F 9/45558 |
| 10,122,602 B1* | 11/2018 | Prateek | H04L 43/50 |
| 10,203,946 B2* | 2/2019 | Dehaan | G06F 8/62 |
| 10,326,845 B1 | 6/2019 | Jaeger | |
| 2004/0230731 A1 | 11/2004 | Arimilli et al. | |
| 2005/0262173 A1 | 11/2005 | Choquier et al. | |
| 2006/0126608 A1 | 6/2006 | Pereira et al. | |
| 2007/0100712 A1* | 5/2007 | Kilpatrick | G06Q 10/06 705/29 |
| 2010/0174395 A1* | 7/2010 | Gu | G05B 17/02 700/110 |
| 2011/0016454 A1 | 1/2011 | Paintal et al. | |
| 2011/0029882 A1* | 2/2011 | Jaisinghani | H04L 41/12 715/736 |
| 2011/0055636 A1 | 3/2011 | Dehaan et al. | |
| 2012/0117405 A1* | 5/2012 | Mokuya | G06F 1/3209 713/323 |
| 2012/0304162 A1 | 11/2012 | Yamauchi et al. | |
| 2013/0007741 A1* | 1/2013 | Britsch | G06F 9/4401 718/1 |
| 2013/0290929 A1 | 10/2013 | Lee et al. | |
| 2014/0165060 A1* | 6/2014 | Muller | G06F 9/5022 718/1 |
| 2015/0100957 A1* | 4/2015 | Botzer | G06F 9/45558 718/1 |
| 2015/0229629 A1* | 8/2015 | Ishaya | H04L 63/08 726/4 |
| 2015/0264138 A1 | 9/2015 | Watts, Jr. et al. | |
| 2016/0232025 A1* | 8/2016 | Speak | G06F 9/45533 |
| 2016/0255139 A1 | 9/2016 | Rathod | |
| 2016/0266921 A1* | 9/2016 | Mao | G06F 9/45558 |
| 2016/0274933 A1* | 9/2016 | Paolino | G06F 9/45558 |
| 2016/0335259 A1* | 11/2016 | Ylonen | G06F 16/2255 |
| 2017/0034023 A1* | 2/2017 | Nickolov | H04L 43/0817 |
| 2017/0250951 A1* | 8/2017 | Wang | H04L 63/0227 |
| 2018/0260237 A1* | 9/2018 | Noll | G06F 8/65 |
| 2018/0287864 A1* | 10/2018 | Hockett | H04L 41/082 |
| 2019/0014059 A1* | 1/2019 | Hu | H04L 47/827 |
| 2019/0034320 A1 | 1/2019 | Stokes | |

OTHER PUBLICATIONS

Shen et al, CloudScale: Elastic resource Scaling for Multi-Tenant Cloud Systems, 2011, ACM, SOCC'11 (Year: 2011).*

Tighe et al, Integrating Cloud Application Autoscaling with Dynamic VM Allocation, 2014, IEEE (Year: 2014).*

"Siebel Test Automation", Cognizant, Apr. 2011, 6 pages. https://www.cognizant.com/whitepapers/Siebel-Test-Automation.pdf.

Notice of Allowance, dated Mar. 3, 2020 regarding USPTO U.S. Appl. No. 15/837,037, 13 pages.

* cited by examiner

BATCH PROCESSING OF COMPUTING ELEMENTS TO CONDITIONALLY DELETE VIRTUAL MACHINE(S)

BACKGROUND

1. Field

The disclosure relates generally to computer systems, and more specifically, to an automation methodology of batch processing computing elements in a computer system.

2. Description of the Related Art

Virtual machines (VMs) are emulations of computer systems that use different operating systems (OSs) on a single physical computer system. Applications running on a virtual machine behave as if they were running on their own physical computer system. Thus, a whole virtual laboratory may be created using several differently configured virtual machines. Hence, virtual machines are rather uniquely suited for software development and testing since they allow software developers and testers to perform their task under various platforms using a minimal number of physical computer systems.

Due to the amount of work that a development team and/or testers may have to complete, a great number of virtual machines may be created on a work computing system. Every once in a while, therefore, the virtual machines that are no longer needed should be deleted out of the work computing system, lest the performance of the work computing system becomes adversely affected due to a lack of available resources.

Presently, virtual machines that are no longer needed are manually deleted from the work computing systems. This can be a rather tedious task since there may be quite a large number of virtual machines to delete. Further, since the virtual machines are deleted manually, there is a likelihood that mistakes may occur in deleting the virtual machines (i.e., the wrong virtual machines may be deleted or not all non-needed virtual machines are deleted etc.).

Thus, there is a need to automate virtual machine deletion from computer systems hosting large numbers of virtual machines.

SUMMARY

The embodiments of the present disclosure provide a computer program product and computing system for batch processing computing elements on a computing system. The computer program product and computing system determine a first configuration of the computing system hosting the computing elements in response to a dry-run request to batch process the computing elements on the computing system, identify a plurality of the computing elements to batch process, generate a list that includes the plurality of the computing elements and that enables user inspection of the plurality of the computing elements. Upon a live run request, which may be subsequent to the user inspection, to batch process the computing elements on the computing system, the computer program product and computing system determine a second configuration of the computing system, compare the first configuration to the second configuration to determine whether or not the computing system has had a change in configuration since the dry-run request, and batch process the plurality of the computing elements in response to determining that the computing system has not had a change in the configuration since the dry-run request.

In one embodiment, the computer program product and computing system compare the first configuration to the second configuration by calculating a first hash based on the first configuration and calculating a second hash based on the second configuration and compare the first hash to the second hash.

In another embodiment, the computer program product and computing system calculate the first hash and second hash based on arguments in the dry-run request and in the live run request, respectively. Further, the user inspection may include determining whether or not each computing element in the list is to be batch processed.

In a further embodiment, the computer program product and computing system identify a plurality of the computing elements in response to the live run request and batch process the plurality of the computing elements identified in response to the live run request.

In yet another embodiment, the computer program product and computing system batch process only computing elements that are identified in both the dry-run and the live run. The dry-run request and the live run request may be from the same user or different users. Further, the computing elements may be virtual machines and batch processing the computing elements may include deleting the virtual machines from the computing system. Alternatively, the computing elements may be data and batch processing the computing elements may include updating the data.

DETAILED DESCRIPTION

The embodiments of the present invention may be a system, a method, and/or a computer program product at any possible technical detail level of integration. The computer program product may include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing devices. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations in accordance with the embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the embodiments of the present invention.

Aspects of the embodiments of the present invention are described herein with reference to flowchart illustrations and/or block diagrams of methods, apparatus (systems), and computer program products according to the embodiments of the present invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Figure 1:
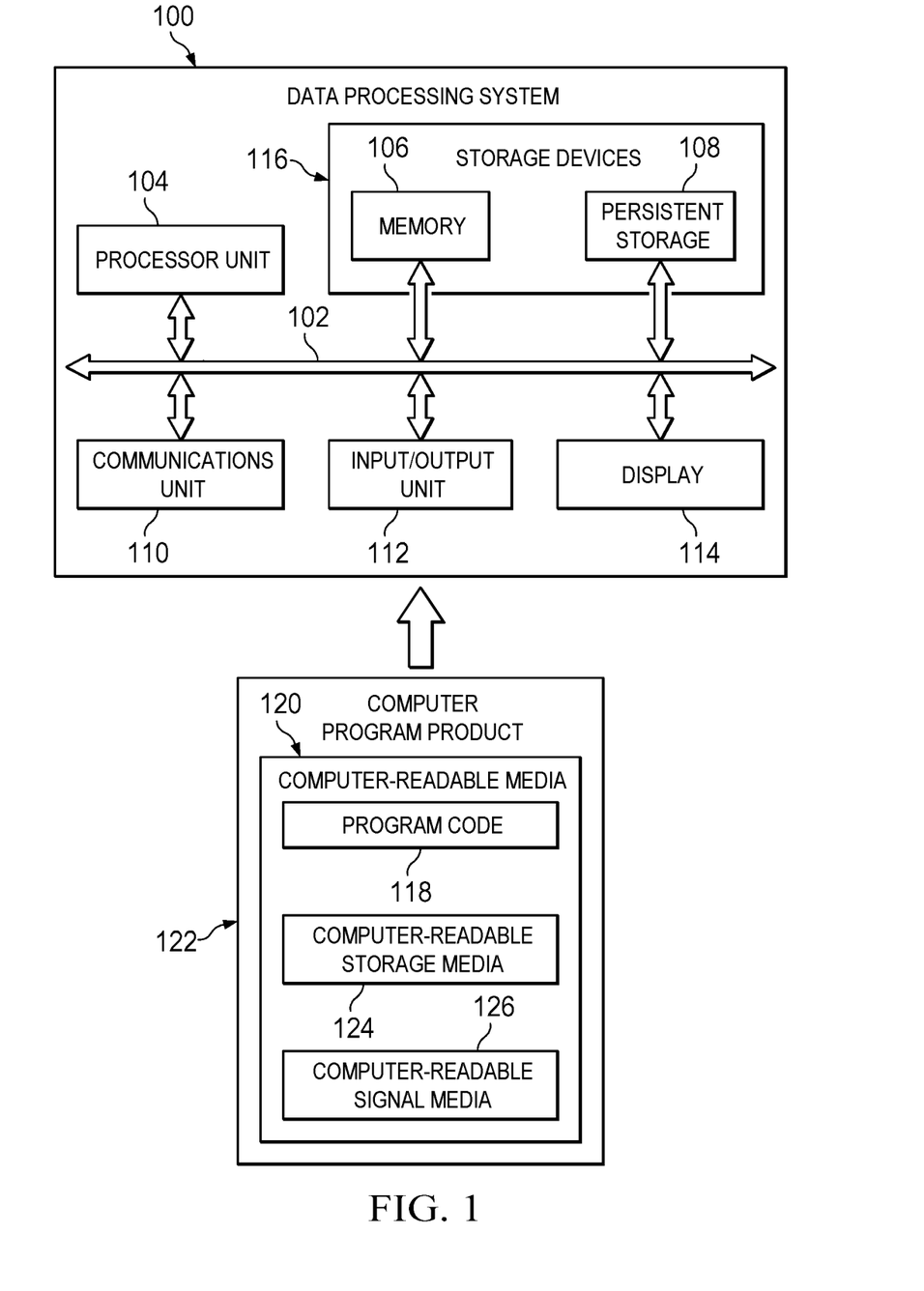
FIG. 1 is an illustration of a block diagram of a data processing system in accordance with an illustrative embodiment of the present invention.

Turning now to the figures, FIG. 1 is an illustration of a block diagram of a data processing system in accordance with an illustrative embodiment of the present invention. In this illustrative example, data processing system 100 includes communications framework 102, which provides communications between processor unit 104, memory 106, persistent storage 108, communications unit 110, input/output unit 112, and display 114. In this example, communications framework 102 may take the form of a bus system.

Processor unit 104 serves to execute instructions for software that may be loaded into memory 106. Processor unit 104 may be a number of processors, a multi-processor core, or some other type of processor, depending on the particular implementation.

Memory 106 and persistent storage 108 are examples of storage devices 116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 116 may also be referred to as computer-readable storage devices in these illustrative examples. Memory 106, in these examples, may be, for example, a random access memory (RAM) or any other suitable volatile or non-volatile storage device. Persistent storage 108 may take various forms, depending on the particular implementation.

For example, persistent storage 108 may contain one or more components or devices. That is, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these illustrative examples, provides for communications with other data processing systems or devices. In these illustrative examples, communications unit 110 is a network interface card.

Input/output unit 112 allows for input and output of data with other devices that may be connected to data processing system 100. For example, input/output unit 112 may provide a connection for user input through at least one of a keyboard, a mouse, or some other suitable input device. Further, input/output unit 112 may send output to a printer. Display 114 provides a mechanism to display information to a user.

Instructions for at least one of the operating system, applications, or programs may be located in storage devices 116, which are in communication with processor unit 104 through communications framework 102. The processes of the different embodiments may be performed by processor unit 104 using computer-implemented instructions, which may be located in a memory, such as memory 106.

These instructions are referred to as program code, computer-usable program code, or computer-readable program code that may be read and executed by a processor in processor unit 104. The program code in the different embodiments may be embodied on different physical or computer-readable storage media, such as memory 106 or persistent storage 108.

Program code 118 is located in a functional form on computer-readable media 120 that is selectively removable and may be loaded onto or transferred to data processing system 100 for execution by processor unit 104. Program code 118 and computer-readable media 120 form computer program product 122 in these illustrative examples. In one example, computer-readable media 120 may be computer-readable storage media 124 or computer-readable signal media 126.

In these illustrative examples, computer-readable storage media 124 is a physical or tangible storage device used to store program code 118 rather than a medium that propagates or transmits program code 118. Alternatively, program code 118 may be transferred to data processing system 100 using computer-readable signal media 126. Computer-readable signal media 126 may be, for example, a propagated data signal containing program code 118. For example, computer-readable signal media 126 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 100 are not meant to provide architectural limitations to the manner in which different embodiments may be implemented. The different illustrative embodiments may be implemented in a data processing system including components, in addition to or in place of those illustrated, for data processing system 100. Other components shown in FIG. 1 can be varied from the illustrative examples shown. The different embodiments may be implemented using any hardware device or system capable of running program code 118.

In any event, data processing system 100, which may be a company's server or a user's personal computer (PC) system, may be used as a development work computer system. As such, a software development team may create virtual machines on data processing system 100 to automate the development work or to create a whole virtual laboratory. Virtual machines generally share available resources of a host computer system. For example, memory 106 may be divided among the created virtual machines. Thus, depending on the number of virtual machines that is created and is operational, memory 106 may not be large enough to be distributed among the virtual machines. In such a case, data processing system 100 may spend time paging data in and out of memory 106 in order to be able to perform a task. The time spent paging data in and out of memory 106 is time that data processing system 100 could use to perform the task. Thus, a large number of virtual machines may adversely affect the responsiveness of data processing system 100. One way to ensure that the responsiveness of data processing system 100 is not adversely affected is to manage, on a periodic basis, the number of virtual machines being hosted by data processing system 100.

Embodiments of the present invention provide an improvement to computer systems hosting virtual machines. The improvement includes assessing the computer systems' performance to determine whether there is a performance degradation and to improve the computer systems' performance by deleting virtual machines that are no longer needed from the computer systems.

Currently, virtual machines that are no longer needed are manually deleted from data processing system 100 in order to manage the number of hosted virtual machines. However, the number of un-needed virtual machines may be quite large. Consequently, automating the task of deleting un-needed virtual machines may be advantageous. Nonetheless, automating the task of deleting un-needed virtual machines may be dangerous as virtual machines that are still being used could inadvertently be deleted. One method of solving this problem is to have a user confirming each virtual machine that is to be deleted from data processing system 100 in a script (i.e., "Are you sure/Do you really want to . . . " prompt in a script). This approach only works when the automation is being run in an interactive manner where the user can easily review the output in context. Further, this approach invites the user to blindly respond to the question without paying attention to the results.

According to one embodiment of the present invention, upon determining a system's performance degradation, a user or a process running on the computer system may run an automation script to delete virtual machines that are no longer needed from the computer system. The automation script may determine a configuration of the computing system, identify the plurality of virtual machines to delete, and delete the identified virtual machines based on the determined configuration.

To identify the virtual machines to be deleted, the automation script may go through a dry-run first. During the dry-run, the automation script may calculate a hash based on the current configuration of the computer system. The identified virtual machines may be presented to a user to make sure that deletion of one of the virtual machines will not adversely affect the system and that all the identified virtual machines should indeed be deleted. After the user has verified all the identified virtual machines as being virtual machines to be deleted, the automation script may go through a live run where the identified virtual machines are deleted. Before deleting the virtual machines, however, the automation script may ensure that the computer system's configuration has not changed since the dry-run. To do so, the automation script may once again calculate a hash based on the current configuration of the system and compare this hash to the hash that was calculated during the dry run. If both hashes are the same, then the computer system's configuration has not changed and the virtual machines may be deleted. Otherwise, the virtual machines are not deleted. Note that, the virtual machines may be considered as computing elements of the computer system and identifying and deleting the virtual machines may be considered as batch processing the computing elements.

Thus, embodiments of the present invention disclose a methodology where a user runs an automation script to delete un-needed virtual machines hosted by a computing system such as data processing system 100. The user may run the automation script as a matter of course or due to observed system performance degradation. In accordance with the methodology, the user may first execute the automation script with a dry-run flag enabled. Upon execution, the automation script may generate a hash of the user's inputs as well as the current state of the environment (i.e., the current configuration of data processing system 100) and generate an output. The output may include a list of virtual machines that are to be deleted as well as the hash. The user may review the dry-run output to ensure that the computing system will perform as expected after the virtual machine deletion, collect the hash, and re-run the automation script this time without the dry-run flag enabled, providing the hash along with the original arguments. The automation script may re-calculate the hash using the supplied arguments and the current state of the environment and confirm the newly generated hash matches the previous hash. If so, the automation script may delete the virtual machines in the list.

As an example, suppose a user needs to run a "Cleanup Virtual Machines" process to delete all virtual machines with a "zzz-*" prefix. The user may submit the request, passing along the "zzz-*" prefix argument as well as a dry-run argument to the process (i.e., the automation script). The "Cleanup Virtual Machines" process may create a hash of the prefix and the current state of the environment of the computing system hosting the virtual machines. In response to the request, the process may examine each virtual machine being hosted by the computing system to identify the virtual machines with the zzz- prefix. The process may then generate a listing of all virtual machines with the zzz- prefix. The user may review the listing, and double-check any virtual machine regarding which the user is not sure about. For example, the user may check with teammates regarding the virtual machines that the user is unsure of etc. After confirming that all of the virtual machines that are in the list are to be deleted, the user may copy the hash embedded in the list and re-submit the request without the dry-run request flag enabled. In this case, the user may submit the prefix "zzz-*" along with the hash collected from the dry-run output. As mentioned above, before deleting the virtual machines, the process may generate another hash out of the "zzz-*" prefix and the current environment of the system and compare the two hashes. If the two hashes are the same, the process may go through the task of deleting the virtual machines in the list.

Note that, a hash is a value, also called a "message digest", or a number generated from a string of text. The hash is substantially smaller than the text itself, and is generated by a formula in such a way that it is extremely unlikely that some other text will produce the same value.

To get the current state of the environment, (i.e., the host system's present configuration) a system, such as Chef, may be used where the state of the environment may be captured in a Git commit. Chef is a configuration management tool for writing system configuration "recipes". Chef is used to streamline the task of configuring and maintaining a company's servers, and can integrate with cloud-based platforms such as Intermap, Google Cloud Platform etc. to automatically provision and configure new computing systems.

Alternatively, a system such as UrbanCode Deploy (UCD), a product of International Business Machines, Corporation (IBM), may be used to capture the current state of the environment of data processing system 100 in component versions. UCD is an application release automation solution that combines visibility, traceability and auditing capabilities into one optimized package. UCD allows for seamlessly deployment to distributed data centers, cloud and virtualized environments as often as needed on demand and/or on schedule.

Further, a window of time where it is assumed that the environment is stable may be used to capture the current state of the environment of data processing system 100. For example, one can calculate the floor of ((current time−unix epoch)/acceptable interval in milliseconds), and assume the environment is stable if this value has not changed or is off by 1.

In addition, to capture the current state of the environment of data processing system 100, the user may include environment variables and any other system configuration relevant to the automation in the request.

Although the disclosure has been described using virtual machine deletion from a host system, it is not thus restricted. Rather, the disclosure is applicable to all types of automation or batch processing of tasks. For example, a user making mass updates may use the disclosure. In this case, the mass update may be to some data owned by a micro-service developed by the user's team. To trigger the update, the user may perform an HTTP POST to a designated endpoint. The micro-service computes the updates and returns the listing of actions to be taken, along with a hash. The user may review the listing and performs a subsequent POST, passing the hash in the If-Match header. The micro-service may recalculate the hash and fail with a 412 if it does not match the value supplied in the If-Match header. If, on the other hand, the two hash values are the same, the micro-service may proceed with the mass update.

Moreover, the disclosure may be used to perform database migrations that should only impact certain records. In such a case, a dry run of a migration script may first be performed to ensure that only records that should be affected will be affected during a live run. A live run of the migration script may subsequently be executed to actually migrate the records.

An additional use of this methodology includes a first user providing a hash to a teammate, a second user, who then executes the actual live run of the automation script. In this case, the first user might be the best person for preparing the inputs and reviewing the outputs for the automation, but only the second user has the authorization to actually perform the live run. Consequently, the first user may perform the dry-run, ensure that the system will carry out the task as expected and hand off a token (i.e., the hash) to the second user so that the actual task may be performed. This, of course, ensures that both the first user and the second user have selected the same inputs and reduces the likelihood of running the automation script in error. It is true that a person can circumvent the invention by hashing the inputs themselves, rather than generating the hash through the dry-run. However, this methodology is not intended as a security measure against nefarious acts, but rather to encourage dry-runs and ensure environment conditions have remained constant since the dry-run.

Further, the disclosure may allow an actual task to be carried out off hours. Specifically, instead of using resources that may be being used during business hours to perform a task, the disclosure allows for identification of the computing elements that are to be batch processed (i.e., the task) during business hours. In this case, a worker may perform the dry-run during business hours, ensure that the system will carry out the task as expected, and then schedule the task to be performed during non-business hours. At the scheduled time, the live run may be performed. The hash, in this case, may be used to make sure that nothing in the system has changed from the time the dry run was performed to the time the live run is performed.

Figure 2:
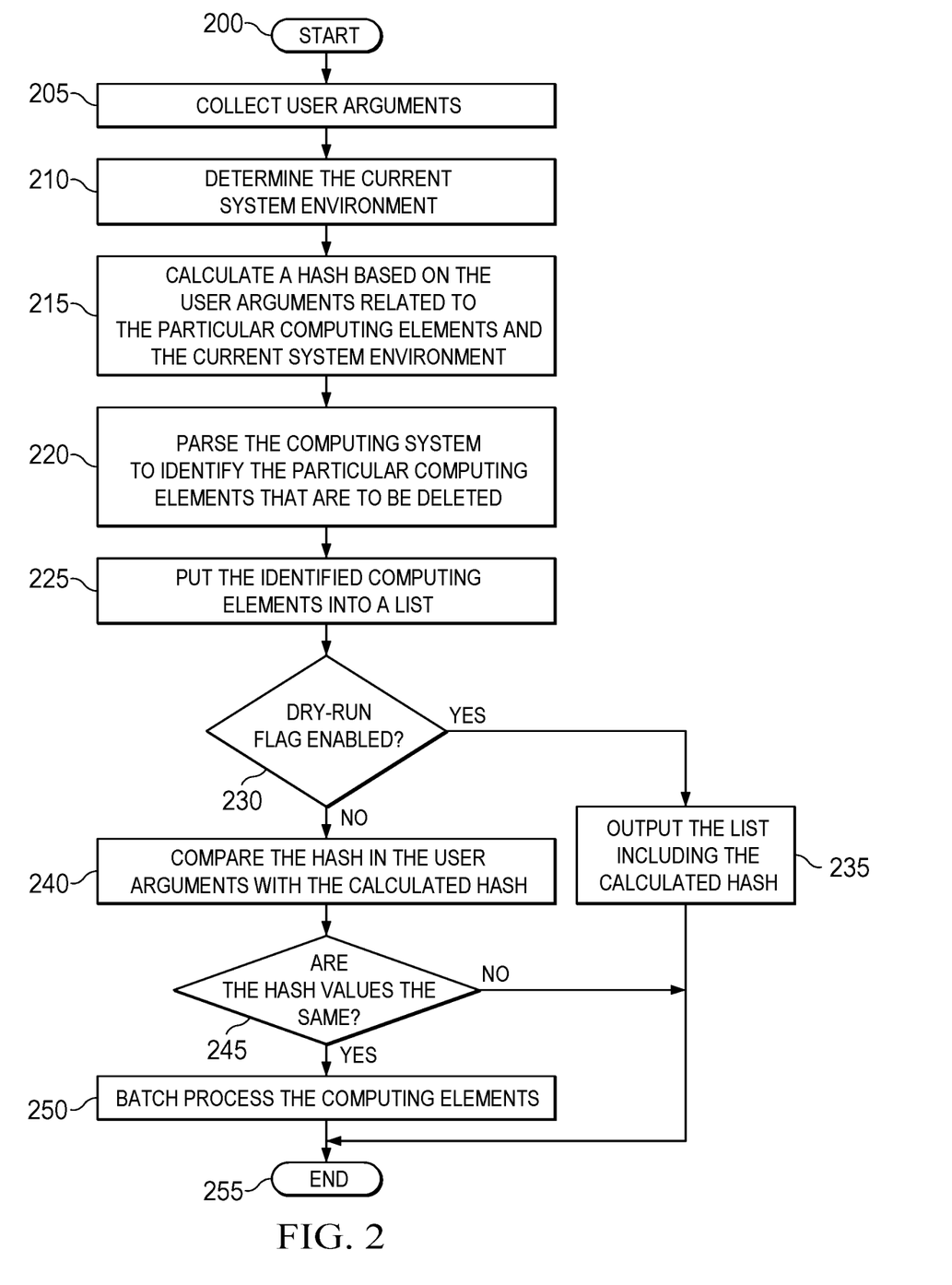
FIG. 2 is a flowchart of an automatic script to manage computing elements, in accordance with an illustrative embodiment of the present invention.

FIG. 2 is a flowchart of an automatic script to manage computing elements, in accordance with an embodiment of the present invention. The computing elements may be virtual machines that are to be deleted, data that is to be updated, records that are to be migrated etc. The process starts at step 200 when a user invokes the automatic script. In invoking the automatic script, the user may pass along various arguments. One argument may include the computing elements or characteristics of particular computing elements in the computing system such that the particular computing elements may be identified and processed. Another argument may include an enabled dry-run flag in the case where the user wants the automatic script to go through a dry-run first to identify the particular computing elements. In the case, where the automatic script has already gone through a dry run, a further argument may include the hash that was evaluated during the dry run. As mentioned before, the hash is a value calculated based on user arguments such as the zzz- prefix of the virtual machines in the example above as well as the current system configuration or environment.

Upon invocation of the automatic script, the automatic script collects the user's arguments (step 205). The automatic script then determines the current system environment (step 210). After determining the current system environment, the automatic script calculates a hash based on the user's arguments related to the particular computing elements and the current system environment (step 215). The automatic script then parses the computing system to identify the particular computing elements that are to be batch processed (step 220). The automatic script then puts the identified (i.e., particular) computing elements into a list (step 225). The automatic script checks to see whether the dry-run flag is enabled (step 230). If the dry-run flag is enabled, the automatic script outputs the list including the calculated hash (step 235). The process terminates thereafter (step 255). If the dry-run flag is not enabled, the automatic script compares the hash in the user arguments with the calculated hash (step 240). The automatic script makes a determination as to whether the hash values are the same (step 245). If the two hash values are not the same, the automatic script terminates (step 255). If the two hash values are the same, the automatic script batch processes the computing elements (i.e., the computing elements in the list) (step 250). The process terminates thereafter (step 255).

In certain instances, data processing system 100, shown in FIG. 1, may monitor the computing system using a hypervisor to determine the system performance. As an example, if the system is not performing as well as it should and the computing elements are virtual machines or on a periodic basis, data processing system 100 may run an automatic script to determine whether some of the hosted virtual machines may be deleted to increase system performance or to delete virtual machines that are no longer needed. Note that a hypervisor or virtual machine monitor (VMM) is a computer software, firmware or hardware that creates and runs virtual machines. In such a case, the automation script may be executed automatically.

During an automatic execution, the automation script may determine a first list of virtual machines that has not been used for at least a certain amount of time by going through a dry-run. This amount of time may be user-configurable. Further, the automation script may also note the time of execution of the dry-run. The automation script may then execute. The output of the execution may include the list of the determined virtual machines, the time of execution and stored into a file for user verification. The automation script may then alert a user by e-mail and/or a text message etc. that the output needs the user's attention. The user may then inspect or double-check the virtual machines in the list to determine whether all the virtual machines in the list are to be deleted. Any virtual machine that is not to be deleted may be taken off the list. After ascertaining that all the virtual machines in the list are to be deleted, the user may give the automation script authorization to delete the virtual machines (i.e., instruct the automation script to go through a live-run). Upon receiving the authorization, the automation script may determine a second list of virtual machines, compare the first list with the second list and delete each particular virtual machine that is in both lists provided of course that the particular virtual machine has not been active since the time the dry-run had executed.

Figure 3:
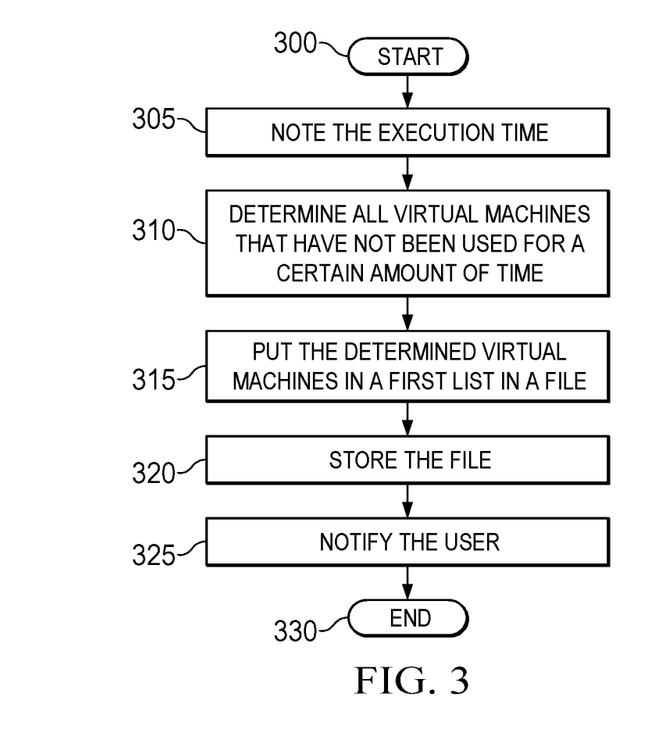
FIG. 3 is a flowchart of an automated process to determine virtual machines being hosted by a computer system for deletion, in accordance with an illustrative embodiment of the present invention.

FIG. 3 is a flowchart of an automated process to determine virtual machines being hosted by a computer system for deletion, in accordance with an embodiment of the present invention. The process starts at step 300. Upon starting, the process notes the execution time (step 305). The process determines all virtual machines that have not been used for at least a certain amount of time (step 310). The process then puts the determined virtual machines in a first list in a file (step 315). The process stores the file (step 320) and notifies the user (step 325). The process terminates thereafter (step 330).

After receiving the notification, the user may verify the virtual machines in the first list to make sure that each and every virtual machine in the stored file is to be deleted. As stated earlier, the user may remove from the first list any virtual machines that is not to be deleted.

Figure 4:
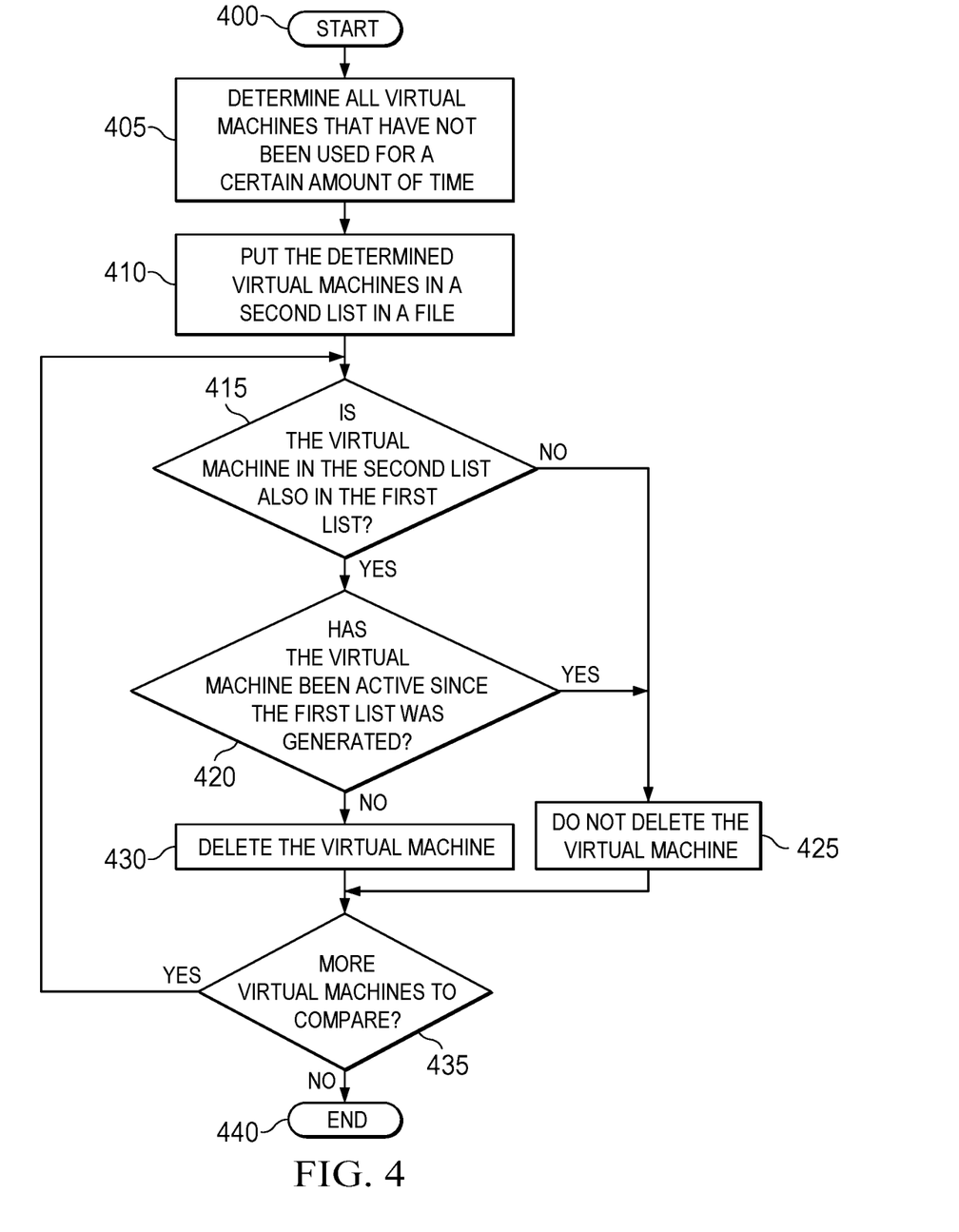
FIG. 4 is a flowchart of an automated process that deletes un-needed virtual machines being hosted by a computer system, in accordance with an illustrative embodiment of the present invention.

FIG. 4 is a flowchart of an automated process that deletes un-needed virtual machines being hosted by a computer system, in accordance with an embodiment of the present invention. The process starts when the user instructs the process to delete the virtual machines in the first list (step 400). Upon starting, the process again determines all virtual machines that have not been used for at least a certain amount of time (step 405). The process then puts the determined virtual machines in a second list in a file (step 410). The process then determines whether the first virtual machine in the second list is also in the first list (step 415). If the virtual machine is not in both the first list and the second list, the virtual machine is not deleted (step 425). If the virtual machine is in both the first list and the second list, using the execution time of the first run, the process determines whether the virtual machines has been active since the first list was generated (step 430). If the virtual machine has been active since the first list was generated, the virtual machine is not deleted (step 425). If the virtual machine has not been active since the first list was generated, the virtual machine is deleted (step 430). Then, the process determines whether there are more VMs in the second list to compare with the first list (step 435). If so, the process returns to step 415. Otherwise, the process terminates (step 440).

Thus, illustrative embodiments of the present invention provide a computer implemented method, computer system, and computer program product that provide an improvement to computing system hosting virtual machines. The computer implemented method, computer system, and computer program product for managing updates (e.g., modifications, deletions) of scripts (e.g., virtual machines) in a complex environment with many dependencies between applications are provided. The computer implemented method, computer system, and computer program product perform a test run of a modification to the script, wherein a first hashing of significant values (e.g., significant variables, file names, significant environmental parameters, or particular outputs) occurs during, or immediately prior to, the test run, and analyzes the results of the dry-run to determine if they are acceptable. If the results are acceptable, the computer implemented method, computer system, and computer program product perform (perhaps at a later date) a live run of the modification to the script, wherein a second hashing of significant values occurs during, or immediately prior to, the live run, compare, during or immediately prior to the live run, the first hash to the second hash, detect a difference between the hashes, the difference serving to indicate that something (e.g., an exception, wrong script selected for actual run) has occurred which has caused significant values to be changed in between the runs; and halt, in response to the detected difference, the live run of the modification so as to avoid permanent damage (e.g., irreversible loss of unintentionally deleted files).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
   at least one storage system for storing program code; and
   at least one processor for executing the program code to process a dry-run request for batch processing computing elements being hosted by the computing system, wherein:
   the computing elements are virtual machines;
   the batch processing includes automated deletion of the virtual machines from the computing system;
   the dry-run request is for performing a dry-run of deletion of the virtual machines, the dry-run of deletion performed by:
      (i) in response to the dry-run request, determining a first configuration of the computing system;
      (ii) identify a first plurality of computing elements of the computing system to batch process; and
      (iii) generate a list, the list including the first plurality of computing elements and enabling user inspection of the first plurality of computing elements to verify deletion of the first plurality of computing elements;
   in response to a live run request to batch process the computing elements being hosted by the computing system, determine a second configuration of the computing system, the live run request being subsequent to the user inspection of the first plurality of computing elements;
   identify a second plurality of computing elements of the computing system to batch process the computing elements being hosted by the computing system; and
   compare the first configuration to the second configuration to determine whether or not the computing system has had a change in configuration since the dry-run request, wherein to compare the first configuration to the second configuration the at least one processor processes the program code to calculate a first hash based on the first configuration and to calculate a second hash based on the second configuration and to compare the first hash to the second hash, wherein the first hash and the second hash are further based on arguments in the dry-run request and in the live run request, respectively; and
   the automated deletion is performed by automatically deleting the second plurality of computing elements in response to determining that the computing system has not changed configuration since the dry-run request.

2. The computer system of claim 1, wherein the second plurality of computing elements that are batch processed are computing elements that are in the first plurality of computing elements.

3. A computer program product comprising:
   a computer-readable storage medium comprising program instructions embodied therewith, wherein the program instructions are executable by a processor on a computing system to cause the processor to:
   in response to a dry-run request to batch processing of computing elements being hosted by the computing system, determine a first configuration of the computing system, wherein the batch processing includes automated deletion of computing elements from the computing system and the dry-run request is for performing a dry-run of automated deletion of a plurality of computing elements;
   identify the plurality of computing elements of the computing system to batch process;
   generate a list, the list including the plurality of computing elements and enabling user inspection of the plurality of computing elements to verify deletion of the plurality of computing elements;
   in response to a live run request to batch process the computing elements being hosted by the computing system, determine a second configuration of the computing system the live run request being subsequent to the user inspection of the plurality of computing elements;
   compare the first configuration to the second configuration to determine whether or not the computing system has had a change in configuration since the dry-run request, wherein to compare the first configuration to the second configuration, the processor processes the program instructions to calculate a first hash based on the first configuration, calculate a second hash based on the second configuration, and compare the first hash to the second hash, wherein the first hash and the second hash are further based on arguments in the dry-run request and in the live run request, respectively; and automatically delete the plurality of computing elements in response to determining that the computing system has not changed configuration since the dry-run request.

4. The computer program product of claim 3, wherein the user inspection includes determining whether or not each computing element in the list is to be batch processed.

5. The computer system of claim 4, wherein the computing elements are virtual machines being hosted by the computer system, and batch processing comprises deleting the virtual machines from the computer system.

6. An apparatus, comprising:
program code stored on at least one storage system; and
at least one processor executing the program code to perform automated steps of:
  receiving a dry-run request, wherein the dry-run request is for performing a dry-run of deletion of virtual machines hosted by a computing system;
  in response to receiving the dry-run request, determining a first configuration of the computing system in response to receiving the dry run request;
  identifying a first plurality of virtual machines that are hosted by the computing system;
  generating a list of the first plurality of virtual machines;
  after generating the list, receiving a live-run request, wherein the live-run request is for automated deletion of virtual machines from the computer system;
  in response to the live-run request, determining a second configuration of the computing system;
  after determining the second configuration of the computer system, identifying a second plurality of virtual machines that are hosted by the computing system, wherein the list is configured to enable user inspection of the first plurality of virtual machines prior to deletion of the second plurality of virtual machines, wherein the user inspection includes determining whether or not each virtual machine in the list is to be deleted;
  comparing the first configuration to the second configuration to determine whether or not the computing system has had a change in configuration since the dry-run request, wherein comparing the first configuration to the second configuration comprises calculating a first hash based on the first configuration, calculating a second hash based on the second configuration, and comparing the first hash to the second hash; and
  automatically deleting the second plurality of virtual machines in response to determining that the computing system has not changed configuration since the dry-run request, wherein:
    a difference between the second hash and the first hash indicates that the computing system has changed configuration since the dry-run request or
    the second hash being a same hash as the first hash indicates that the computing system has not changed configuration since the dry-run request and wherein:
    the first hash and the second hash are further based on arguments in the dry-run request and in the live-run request, respectively.

7. The apparatus of claim 6, wherein the second plurality of virtual machines that are deleted are virtual machines that are in the first plurality of virtual machines.

8. The apparatus of claim 6, wherein automated comparison of the first configuration to the second configuration is adapted to assess whether or not performance of the computing system has been degraded as a result of continued operation of the second plurality of virtual machines.

9. The apparatus of claim 8, wherein automated deletion of the second plurality of virtual machines improves the performance of the computing system.

* * * * *